(12) United States Patent
Byon (10) Patent No.: US 11,906,053 B2
(45) Date of Patent: Feb. 20, 2024

(54) VALVE DEVICE AND METHOD FOR MANUFACTURING THE SAME

(71) Applicant: IHI Corporation, Tokyo (JP)

(72) Inventor: Jinhee Byon, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/841,743

(22) Filed: Jun. 16, 2022

(65) Prior Publication Data
US 2022/0307605 A1 Sep. 29, 2022

Related U.S. Application Data

(63) Continuation of application No. PCT/JP2021/010686, filed on Mar. 16, 2021.

(30) Foreign Application Priority Data

Apr. 7, 2020 (JP) .................................. 2020-069163

(51) Int. Cl.
*F16K 1/22* (2006.01)
*F16K 1/20* (2006.01)
*F02B 37/18* (2006.01)

(52) U.S. Cl.
CPC ............ *F16K 1/221* (2013.01); *F16K 1/2007* (2013.01); *F16K 1/2014* (2013.01); *F02B 37/183* (2013.01); *F02B 37/186* (2013.01); *Y02T 10/12* (2013.01)

(58) Field of Classification Search
CPC .......... F16K 1/221; F16K 1/20; F16K 1/2007; F16K 1/2014; F02B 37/186; F02B 37/183; Y02T 10/12
(Continued)

(56) References Cited

U.S. PATENT DOCUMENTS 1,980,495 A * 11/1934 Muir .................. F16K 1/20
251/86
8,820,709 B2 * 9/2014 Lombard .............. F02B 37/186
251/301
(Continued)

FOREIGN PATENT DOCUMENTS

DE 102015 209 042 A1 * 11/2016
JP 56-097530 U 8/1981
(Continued)

OTHER PUBLICATIONS

International Search Report dated Jun. 8, 2021 in PCT/JP2021/010686 filed on Mar. 16, 2021, 6 pages (with English Translation).

*Primary Examiner* — John Bastianelli
(74) *Attorney, Agent, or Firm* — Oblon, McClelland, Maier & Neustadt, L.L.P.

(57) ABSTRACT

A valve device includes: a mounting plate including a rotary shaft; an insertion hole formed in the mounting plate; a valve including a shaft portion inserted into the insertion hole; a larger-diameter portion of the shaft portion, at least a part of the larger-diameter portion being located within the insertion hole; a smaller-diameter portion of the shaft portion, a diameter of the smaller-diameter portion being smaller than that of the larger-diameter portion; a stepped surface formed between the larger-diameter portion and the smaller-diameter portion on the shaft portion; and a position regulating portion provided on the smaller-diameter portion, the position regulating portion being attached on the smaller-diameter portion at a position spaced apart from the stepped surface in a central axis direction of the shaft portion.

6 Claims, 11 Drawing Sheets

(58) Field of Classification Search
USPC .......................................................... 251/308
See application file for complete search history.

(56) References Cited

U.S. PATENT DOCUMENTS

| | | | |
|---|---|---|---|
| 9,011,086 B2* | 4/2015 | Herrera Celaya | .... F02B 39/005 |
| | | | 415/200 |
| 9,145,825 B2* | 9/2015 | Kierat | ...................... F02B 37/18 |
| 10,125,672 B2* | 11/2018 | Goeckelmann | ....... F01D 17/105 |
| 2012/0055154 A1* | 3/2012 | Ebert | .................... F01D 17/105 |
| | | | 60/602 |
| 2014/0366530 A1 | 12/2014 | Murayama et al. | |
| 2018/0073425 A1* | 3/2018 | Stilgenbauer | ......... F02B 37/186 |
| 2018/0230848 A1 | 8/2018 | Iwata | |
| 2019/0003376 A1 | 1/2019 | Schawer et al. | |
| 2019/0010864 A1* | 1/2019 | Hoffmann | ............. F02B 37/186 |
| 2021/0033001 A1 | 2/2021 | Kato et al. | |

FOREIGN PATENT DOCUMENTS

| | | |
|---|---|---|
| JP | 63-009426 U | 1/1988 |
| JP | 11-294200 A | 10/1999 |
| JP | 2013-185552 A | 9/2013 |
| JP | 2015-197068 A | 11/2015 |
| JP | 2017-150306 A | 8/2017 |
| JP | 2018-031310 A | 3/2018 |
| JP | 2018-132003 A | 8/2018 |
| JP | 2019-502860 A | 1/2019 |
| WO | WO 2019/198284 A1 | 10/2019 |

* cited by examiner

VALVE DEVICE AND METHOD FOR MANUFACTURING THE SAME

CROSS REFERENCE TO RELATED APPLICATIONS

This application is a continuation application of International Application No. PCT/JP2021/010686, filed on Mar. 16, 2021, which claims priority to Japanese Patent Application No. 2020-069163, filed on Apr. 7, 2020, the entire contents of which are incorporated by reference herein.

BACKGROUND ART

Technical Field

The present disclosure relates to a valve device and a method for manufacturing a valve device.

Patent Literature 1 discloses a valve device for a turbine housing. The valve device comprises a rotary shaft, a mounting plate, a valve, and a position regulating portion. The rotary shaft is rotatably provided in the turbine housing. The mounting plate is integrally attached to the rotary shaft. An insertion hole is formed in the mounting plate. A shaft portion is formed in the valve. The shaft portion of the valve is inserted into the insertion hole of the mounting plate. With the shaft portion of the valve inserted into the insertion hole in the mounting plate, the position regulating portion is attached to the shaft portion of the valve. The valve rotates integrally with the rotating shaft. For example, the valve opens and closes the wastegate port formed in the turbine housing.

CITATION LIST

Patent Literature

Patent Literature 1: JP 2015-197068 A

SUMMARY

Technical Problem

In order for the valve to properly close the wastegate port, the gap between the mounting plate and the position regulating portion must be correctly controlled. In Patent Literature 1, the position regulating portion is swaged to an end of the shaft portion of the valve. In other words, the position of the position regulating portion is determined by the swaging position of the shaft of the valve. Therefore, in order to control the gap between the mounting plate and the position control portion, it is necessary to strictly control the dimensional tolerance of the valve and the mounting plate. In other words, surfaces of the valve and the mounting plate need to be machined with higher accuracy, which causes cost increase.

The present disclosure aims to provide a valve device and a method for manufacturing a valve device that can reduce costs.

Solution to Problem

To solve the above problem, the valve device of the present disclosure includes: a mounting plate including a rotary shaft; an insertion hole formed in the mounting plate; a valve including a shaft portion inserted into the insertion hole; a larger-diameter portion of the shaft portion, at least a part of the larger-diameter portion being located within the insertion hole; a smaller-diameter portion of the shaft portion, a diameter of the smaller-diameter portion being smaller than that of the larger-diameter portion; a stepped surface formed between the larger-diameter portion and the smaller-diameter portion on the shaft portion; and a position regulating portion provided on the smaller-diameter portion, the position regulating portion being attached on the smaller-diameter portion at a position spaced apart from the stepped surface in a central axis direction of the shaft portion.

The stepped surface may be located within the insertion hole of the mounting plate.

The valve device may include: an opposing portion of the position regulating portion, the opposing portion being positioned spaced apart from the mounting plate with respect to a surface closest to the mounting plate in the position regulating portion, the opposing portion facing the stepped surface in the central axis direction, wherein the stepped surface may be positioned closer to the position regulating portion with respect to an opposing surface of the mounting plate, the opposing surface facing the position regulating portion in the central axis direction.

The valve device may include a spring arranged between the position regulating portion and the mounting plate.

To solve the above problem, in a method for manufacturing a valve device according to the present disclosure, the valve device includes: a mounting plate including a rotary shaft; an insertion hole formed in the mounting plate; a valve including a shaft portion inserted into the insertion hole; a larger-diameter portion of the shaft portion, at least a part of the larger-diameter portion being located within the insertion hole; a smaller-diameter portion of the shaft portion, a diameter of the smaller-diameter portion being smaller than that of the larger-diameter portion; a stepped surface formed between the larger-diameter portion and the smaller-diameter portion on the shaft portion; and a position regulating portion provided on the smaller-diameter portion, the position regulating portion being attached on the smaller-diameter portion at a position spaced apart from the stepped surface in a central axis direction of the shaft portion. The method includes steps of: inserting the larger-diameter portion of the valve into the insertion hole of the mounting plate; inserting the smaller-diameter portion of the valve into a hole of the position regulating portion; adjusting a position of the position regulating portion to a separation position that is spaced apart from the stepped surface in the central axis direction; and fixing the position regulating portion on the smaller-diameter portion.

The separation position may be determined based on a separation distance that is preset with respect to the mounting plate.

The method may include a step of inserting the smaller-diameter portion into a spring before inserting the smaller-diameter portion into the hole, wherein the separation position may be determined based on a load applied to the spring.

Effects of Disclosure

According to the present disclosure, it is possible to reduce costs.

DESCRIPTION OF EMBODIMENTS

Embodiments of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the figures.

Figure 1:
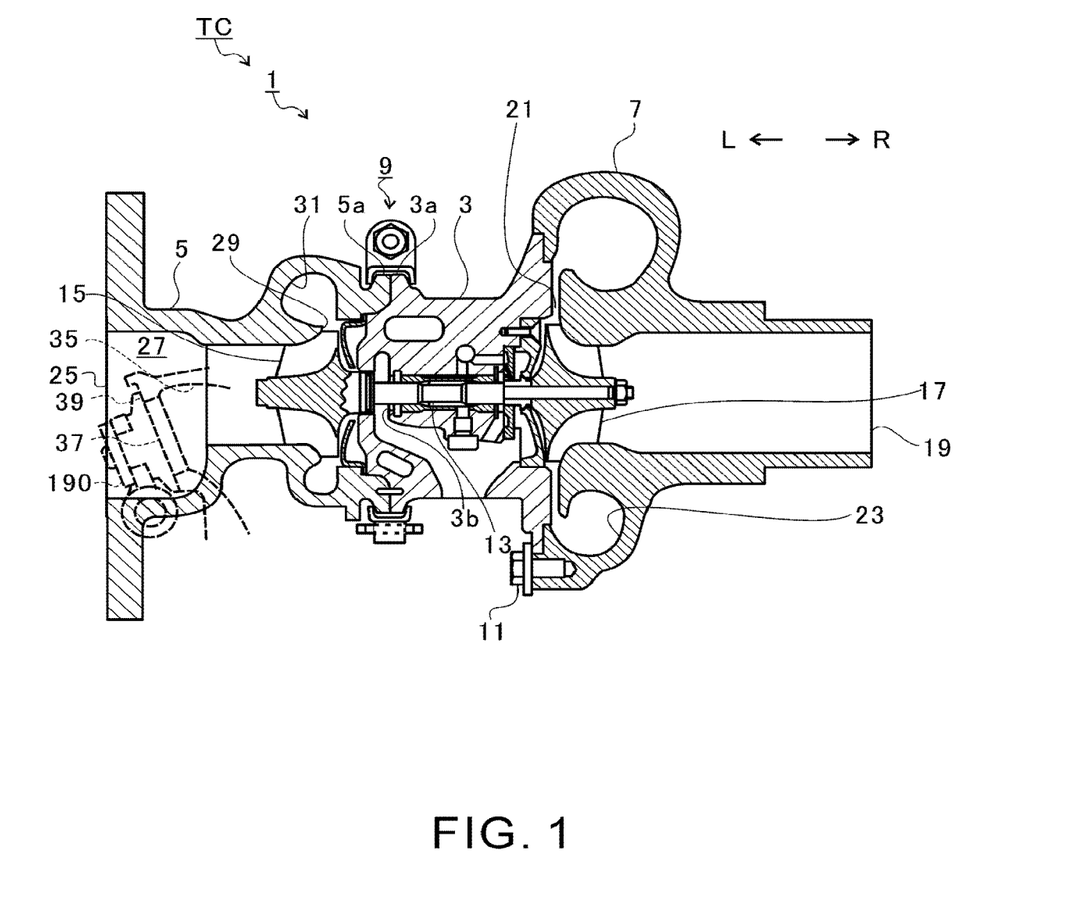
FIG. 1 is a schematic cross-sectional view of a turbocharger.

FIG. 1 is a schematic cross-sectional view of a turbocharger TC. Hereinafter, a direction indicated by an arrow L shown in FIG. 1 is described as the left side of the turbocharger TC. A direction indicated by an arrow R shown in FIG. 1 is described as the right side of the turbocharger TC. As shown in FIG. 1, the turbocharger TC comprises a turbocharger body 1. The turbocharger body 1 includes a bearing housing 3, a turbine housing 5, and a compressor housing 7. The turbine housing 5 is connected to the left side of the bearing housing 3 by a fastening mechanism 9. The compressor housing 7 is connected to the right side of the bearing housing 3 by fastening bolts 11.

A protrusion 3a is provided on an outer surface of the bearing housing 3. The protrusion 3a is provided closer to the turbine housing 5. The protrusion 3a protrudes in a radial direction of the bearing housing 3. A protrusion 5a is provided on an outer surface of the turbine housing 5. The protrusion 5a is provided closer to the bearing housing 3. The protrusion 5a protrudes in a radial direction of the turbine housing 5. The bearing housing 3 and the turbine housing 5 are band-fastened by the fastening mechanism 9. The fastening mechanism 9 includes, for example, a G-coupling. The fastening mechanism 9 clamps the protrusions 3a and 5a.

A bearing hole 3b is formed in the bearing housing 3. The bearing hole 3b penetrates in the left-to-right direction of the turbocharger TC. A bearing is arranged in the bearing hole 3b. A shaft 13 is inserted into the bearing. The bearing rotatably supports the shaft 13. In the present embodiment, the bearing is a sliding bearing. However, the bearing is not limited thereto, and may also be a rolling bearing. A turbine impeller 15 is provided at the left end of the shaft 13. The turbine impeller 15 is rotatably housed in the turbine housing 5. A compressor impeller 17 is provided at the right end of shaft 13. The compressor impeller 17 is rotatably housed in the compressor housing 7.

An inlet 19 is formed in the compressor housing 7. The inlet 19 opens to the right side of the turbocharger TC. The inlet 19 is connected to an air cleaner (not shown). A diffuser flow path 21 is formed by the opposing surfaces of the bearing housing 3 and the compressor housing 7. The diffuser flow path 21 pressurizes air. The diffuser flow path 21 is formed in an annular shape. The diffuser flow path 21 is connected to the inlet 19 via the compressor impeller 17 at a radially inner part.

A compressor scroll flow path 23 is formed in the compressor housing 7. The compressor scroll flow path 23 is formed in an annular shape. The compressor scroll flow path 23 is located, for example, outside the diffuser flow path 21 in a radial direction of the shaft 13. The compressor scroll flow path 23 is connected to an engine intake (not shown) and the diffuser flow path 21. When the compressor impeller 17 rotates, air is sucked into the compressor housing 7 from the inlet 19. The intake air is pressurized and accelerated while passing through blades of the compressor impeller 17. The pressurized and accelerated air is further pressurized in the diffuser flow path 21 and the compressor scroll flow path 23. The pressurized air is directed to the engine intake.

An outlet 25 is formed in the turbine housing 5. The outlet 25 opens to the left side of the turbocharger TC. The outlet 25 is connected to an exhaust gas purifier (not shown). An internal space 27 is formed inside the turbine housing 5. The internal space 27 opens to the outlet 25. The internal space 27 is formed downstream of the turbine impeller 15 (closer to the outlet 25).

A connecting path 29 and a turbine scroll flow path 31 are formed in the turbine housing 5. The turbine scroll flow path 31 is formed in an annular shape. The turbine scroll flow path 31 is located, for example, outside the connecting path 29 in the radial direction of the shaft 13. The turbine scroll flow path 31 is connected to a gas inlet 33 (see FIG. 2). Exhaust gas discharged from an exhaust manifold (not shown) of the engine is directed to the gas inlet 33. The connecting path 29 connects the turbine scroll flow path 31 to the outlet 25 (internal space 27) through the turbine impeller 15. The exhaust gas led from the gas inlet 33 to the turbine scroll flow path 31 is led to the outlet 25 through the connecting path 29, the turbine impeller 15 and the internal space 27. The exhaust gas led to the outlet 25 rotates the turbine impeller 15 while passing therethrough.

The rotational force of the turbine impeller 15 is transmitted to the compressor impeller 17 via the shaft 13. As the compressor impeller 17 rotates, the air is pressurized as described above. As such, the air is directed to the engine intake.

Figure 2:
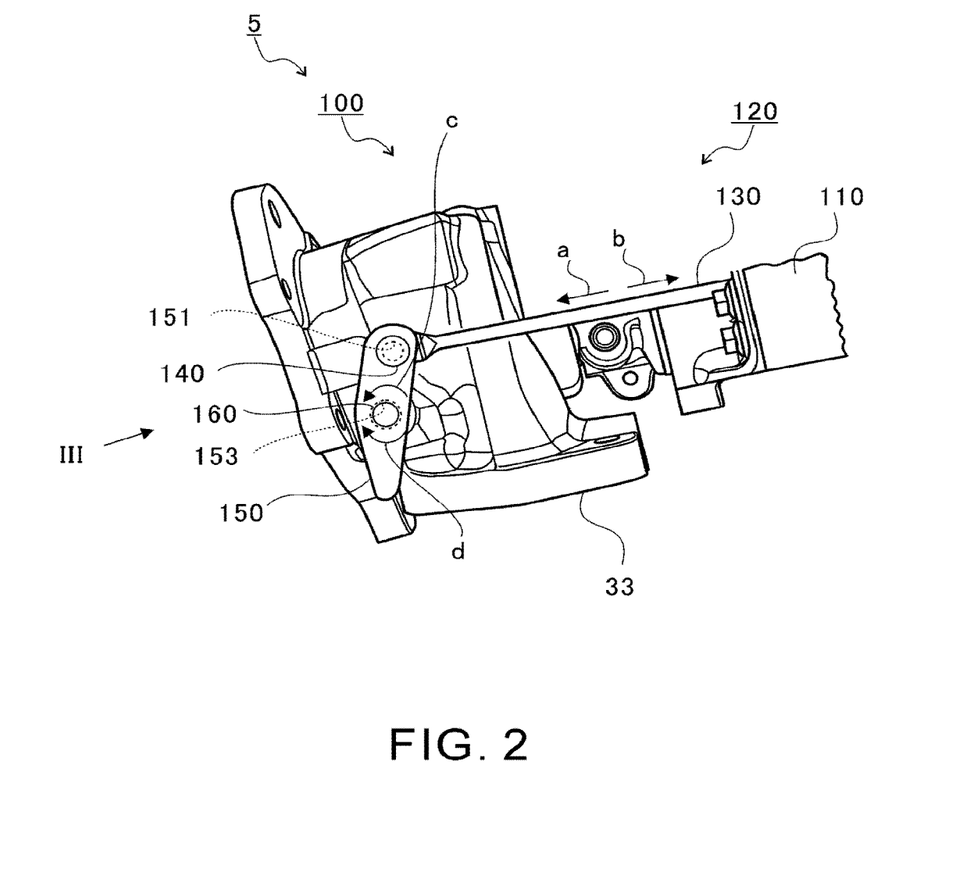
FIG. 2 is a perspective view of a turbine housing.

FIG. 2 is a perspective view of the turbine housing 5. As shown in FIG. 2, the turbine housing 5 is provided with a valve device 100. The valve device 100 comprises an actuator 110 and a link mechanism 120. The link mechanism 120 includes a rod 130, a connecting pin 140, a link plate 150, and a rotary shaft 160. As shown in FIG. 2, the actuator 110, the rod 130, the connecting pin 140, and the link plate 150 are located outside the turbine housing 5.

The actuator 110 is connected to the rod 130. The actuator 110 moves the rod 130 in a central axis direction of the rod 130 (directions indicated by arrow a and arrow b in FIG. 2). The rod 130 is connected to the actuator 110 at one end, and to the connecting pin 140 at the other end. The connecting pin 140 connects the rod 130 to the link plate 150. In this embodiment, the connecting pin 140 is fixed to the rod 130. The connecting pin 140 rotatably holds the link plate 150.

A pin hole 151 and a shaft hole 153 are formed in the link plate 150. The connecting pin 140 is inserted into the pin hole 151. The rotary shaft 160 is inserted into the shaft hole 153. The rotary shaft 160 is fixed to the link plate 150. The rotary shaft 160 rotates integrally with the link plate 150.

When the actuator 110 is driven, the rod 130 moves in the direction of arrow a or in the direction of arrow b in FIG. 2. When the rod 130 moves in the direction of arrow a in FIG. 2, the link plate 150 rotates in a direction of arrow c in FIG. 2 around a central axis of the rotary shaft 160. When the rod 130 moves in the direction of arrow b in FIG. 2, the link plate 150 rotates in a direction of arrow d in FIG. 2 around the central axis of the rotary shaft 160.

Figure 3:
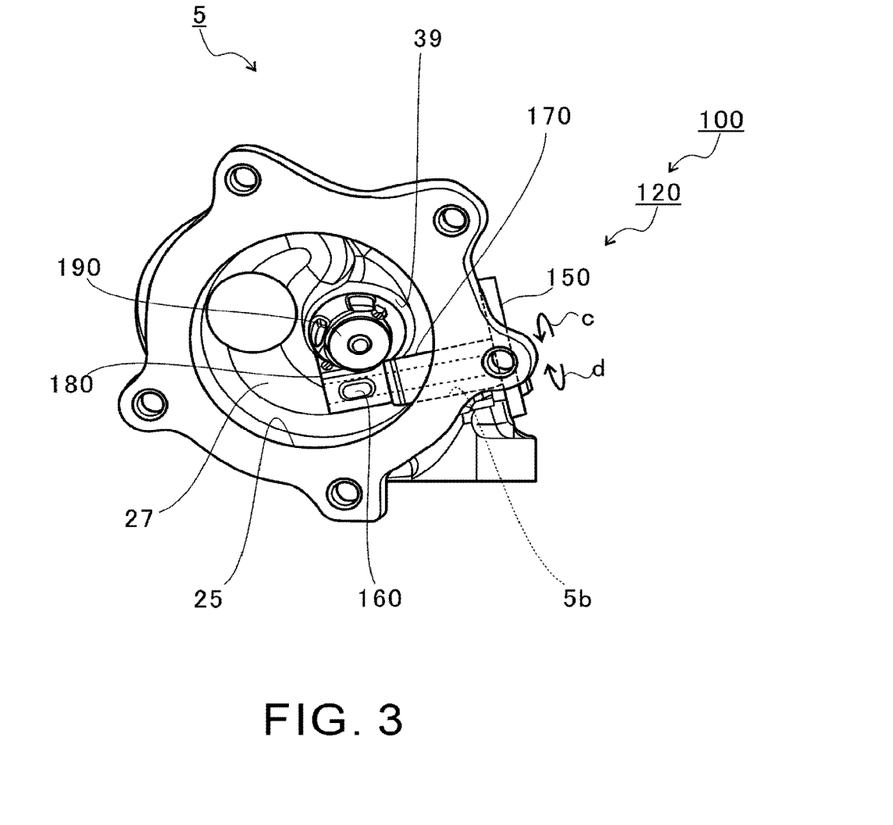
FIG. 3 is a view seen from arrow III in FIG. 2.

FIG. 3 is a view seen from arrow III in FIG. 2. FIG. 3 is an internal view of the turbine housing 5. As shown in FIG. 3, the link mechanism 120 includes a bearing portion 170, a mounting plate 180, and a valve 190. The bearing portion 170, the mounting plate 180 and the valve 190 are arranged in the internal space 27 of the turbine housing 5.

A through hole 5b is formed in the turbine housing 5. The bearing portion 170 is inserted into the through hole 5b. The bearing portion 170 has a cylindrical shape. The rotary shaft 160 is inserted into the bearing portion 170. The bearing portion 170 rotatably supports the rotary shaft 160.

The rotary shaft 160 is arranged outside the turbine housing 5 at one end, and arranged inside the turbine housing 5 at the other end. The rotary shaft 160 is connected to the link plate 150 at the one end, and connected to the mounting plate 180 at the other end. The mounting plate 180 is integrally attached to the rotary shaft 160. For example, the mounting plate 180 is welded to the rotary shaft 160 and rotates integrally with the rotary shaft 160. In the present embodiment, the mounting plate 180 is formed separately from the rotary shaft 160. However, the mounting plate 180 is not limited thereto, and may be formed as an integral part of the rotary shaft 160. In the mounting plate 180, the valve 190 is attached to a part opposite to where the rotary shaft 160 is connected. The mounting plate 180 holds the valve 190.

Figure 4:
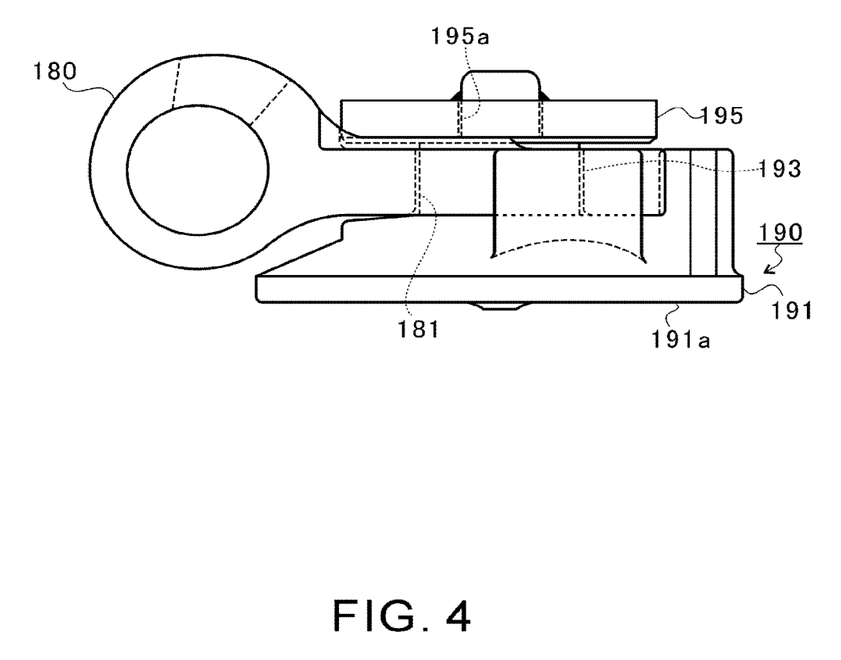
FIG. 4 is an illustration of a connection structure of a valve and a mounting plate.

FIG. 4 is an illustration of a connection structure of the valve 190 and the mounting plate 180. As shown in FIG. 4, the valve 190 includes a body portion 191 and a shaft portion 193. A position regulating portion 195 is attached to the shaft portion 193 of the valve 190. The body portion 191 includes a contact surface 191a. The shaft portion 193 is formed on the body portion 191 at a side opposite to where the contact surface 191a is formed. The shaft portion 193 extends in a direction orthogonal to the contact surface 191a. The position regulating portion 195 has a disk shape. The position regulating portion 195 includes a hole 195a.

An insertion hole 181 is formed in the mounting plate 180. The shaft portion 193 of the valve 190 is inserted into the insertion hole 181 of the mounting plate 180. The shaft portion 193 is inserted into the hole 195a of the position regulating portion 195. The position regulating portion 195 is located on the mounting plate 180 at a side opposite to the body portion 191. The position regulating portion 195 is attached (fixed) to the shaft portion 193 by welding or adhesion, for example. The mounting plate 180 is sandwiched between the body portion 191 and the position regulating portion 195. The position regulating portion 195 prevents the valve 190 from falling off the mounting plate 180.

As shown in FIG. 1, a bypass flow path 35 and a wastegate port 37 are formed in the turbine housing 5. The bypass flow path 35 is connected to the turbine scroll flow path 31 at one end, and the other end is connected to the internal space 27 via the wastegate port 37. The bypass flow path 35 connects the turbine scroll flow path 31 to the internal space 27. The bypass flow path 35 and the wastegate port 37 are located radially outside the turbine impeller 15. The bypass flow path 35 directs a portion of the exhaust gas flowing in the turbine scroll flow path 31 into the internal space 27 with bypassing the turbine impeller 15.

In an inner wall forming the internal space 27 of the turbine housing 5, the wastegate port 37 is formed on a seat surface 39 where the valve 190 can contact. The wastegate port 37 is formed downstream of the turbine impeller 15 (closer to the outlet 25). The wastegate port 37 connects the bypass flow path 35 to the internal space 27.

The valve 190 is a valve body of which outer diameter is larger than an inner diameter of the wastegate port 37. In this embodiment, the valve 190 is a wastegate valve. The valve 190 closes the wastegate port 37 when in contact with the seat surface 39. When the wastegate port 37 is closed, a portion of the exhaust gas flowing in the turbine scroll flow path 31 does not flow out to the internal space 27 through the bypass flow path 35 and the wastegate port 37.

The valve 190 opens the wastegate port 37 when spaced apart from the seat surface 39. When the wastegate port 37 is opened, a portion of the exhaust gas flowing in the turbine scroll flow path 31 flows out to the internal space 27 through the bypass flow path 35 and the wastegate port 37.

Returning to FIG. 3, when the actuator 110 (see FIG. 2) drives the rotary shaft 160 to rotate in the direction of arrow c in FIG. 3, the mounting plate 180 integrally rotates with the rotary shaft 160 in the direction of arrow c in FIG. 3. When the mounting plate 180 rotates in the direction of arrow c in FIG. 3, the valve 190 supported by the mounting plate 180 rotates around the central axis of the rotary shaft 160 in the direction of arrow c in FIG. 3.

Figure 5:
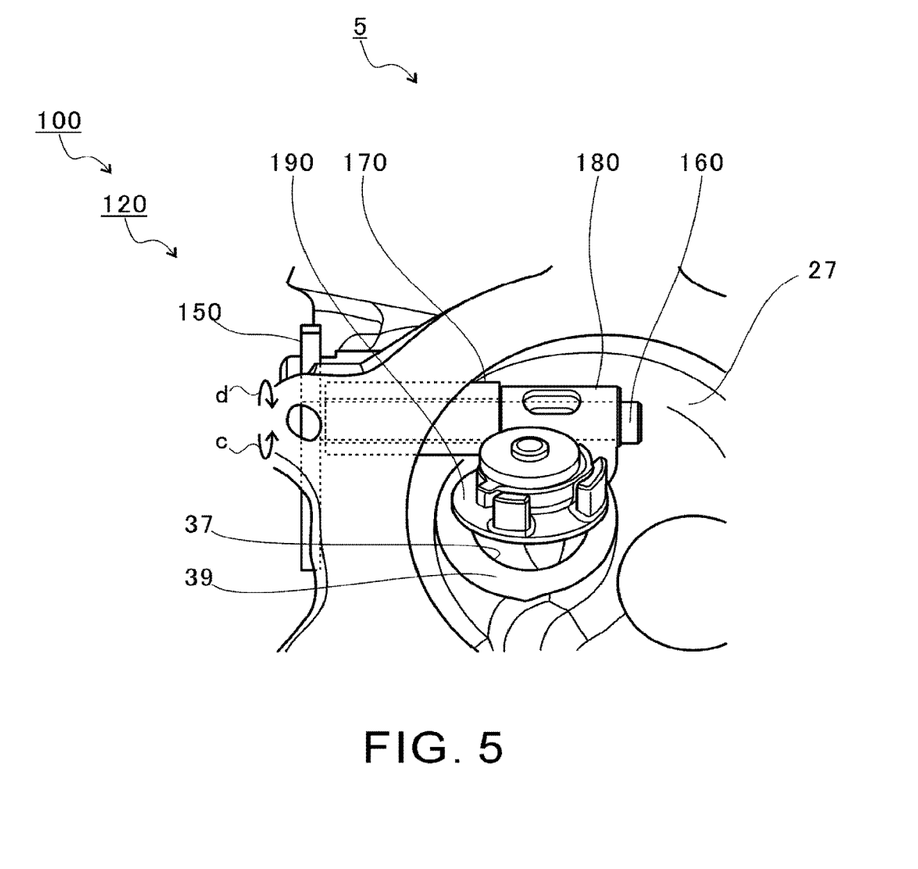
FIG. 5 is an internal view of the turbine housing after the valve shown in FIG. 3 has rotated in the direction of arrow c.

FIG. 5 is an internal view of the turbine housing 5 after the valve 190 shown in FIG. 3 rotates in the direction of arrow c. As shown in FIG. 5, when the valve 190 rotates in the direction of arrow c, the valve 190 moves in a direction spaced apart from the seat surface 39. When the valve 190 is spaced apart from the seat surface 39, the wastegate port 37 is in an open state. Meanwhile, when the actuator 110 (see FIG. 2) drives the mounting plate 180 with the rotary shaft 160 to rotate in the direction of arrow d in FIG. 5, the valve 190 rotates around the central axis of the rotary shaft 160 in the direction of arrow d in FIG. 5. As the valve 190 rotates in the direction of arrow d, the valve 190 moves in a direction closer to the seat surface 39 as shown in FIG. 3. When the valve 190 approaches and contacts the seat surface 39, the wastegate port 37 is in a closed state.

As shown in FIG. 4, a small gap is formed between the mounting plate 180 and the position regulating portion 195. As this gap decreases, the movement of the valve 190 with respect to the mounting plate 180 is more restricted. As the movement of the valve 190 decreases, the valve 190 is more likely to partially contact the seat surface 39 where the wastegate port 37 is formed in the turbine housing 5. When the valve 190 is partially in contact with the seat surface 39, the valve 190 cannot close the wastegate port 37.

In contrast, as the gap between the mounting plate 180 and the position regulating portion 195 increases, the movement of the valve 190 with respect to the mounting plate 180 is more allowed. As the movement of the valve 190 increases, the pressure of the exhaust gas discharged from the wastegate port 37 causes the valve 190 moves easily in the direction spaced apart from the seat surface 39. When the valve 190 moves in the direction spaced apart from the seat surface 39, the valve 190 cannot close the wastegate port 37. As the movement of the valve 190 increases, the valve 190 is more likely to hit other components (e.g., the seat surface 39) when the exhaust gas is discharged from the wastegate port 37, resulting in vibration and noise.

Considering the above circumstances, it is necessary to correctly control the gap between the mounting plate 180 and the position regulating portion 195. In Patent Literature 1 described above, the position regulating portion is swaged to the end of the shaft portion of the valve. In other words, the position of the position regulating portion is determined by the swaging position of the shaft portion of the valve. Therefore, in order to control the gap between the mounting plate and the position control portion, it is necessary to strictly control the dimensional tolerance of the valve and the mounting plate. In other words, surfaces of the valve and the mounting plate need to be machined with higher accuracy, which causes cost increase.

Figure 6:
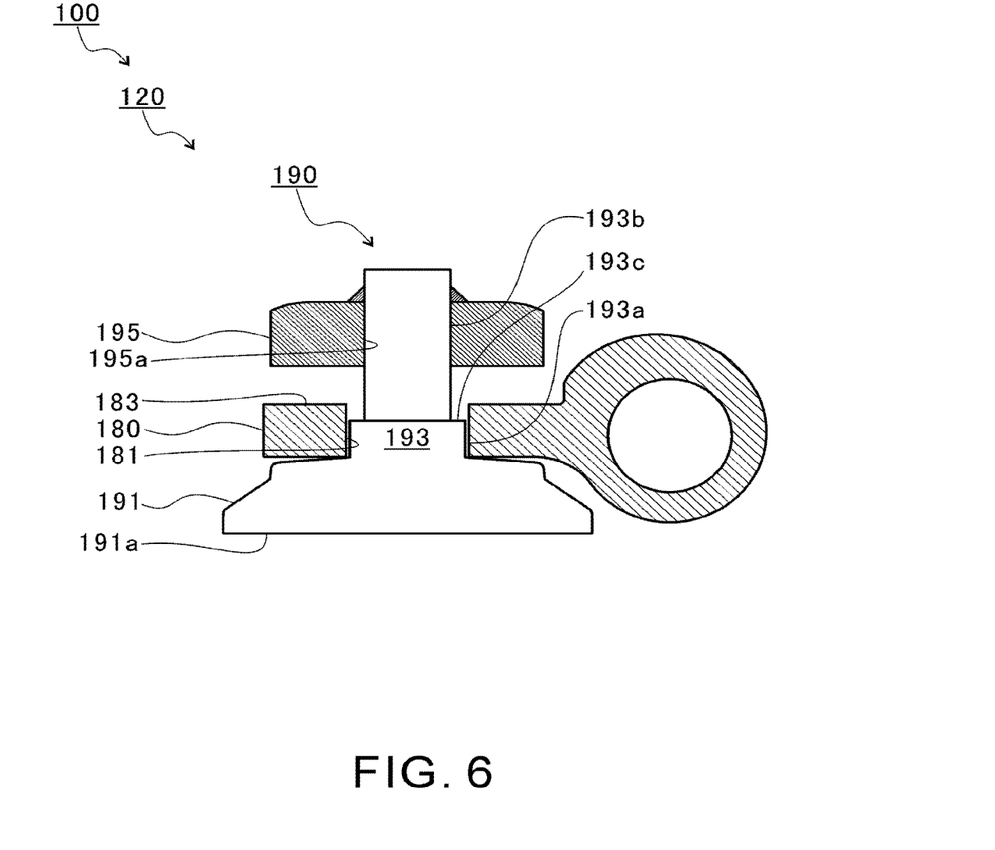
FIG. 6 is a schematic cross-sectional view of the mounting plate, the valve, and a position regulating portion according to an embodiment.

FIG. 6 is a schematic cross-sectional view of the mounting plate 180, the valve 190 and the position regulating portion 195 according to an embodiment. As shown in FIG. 6, the shaft portion 193 of the valve 190 includes a larger-diameter portion 193a, a smaller-diameter portion 193b, and a stepped surface 193c.

The larger-diameter portion 193a has a substantially cylindrical shape. The larger-diameter portion 193a has a substantially constant outer diameter. The larger-diameter portion 193a is continuous with the body portion 191 of the valve 190. The larger-diameter portion 193a is at least partially located within the insertion hole 181.

The smaller-diameter portion 193b has a substantially cylindrical shape. The smaller-diameter portion 193b has a substantially constant outer diameter. The outer diameter of the smaller-diameter portion 193b is smaller than that of the larger-diameter portion 193a. The central axis of the smaller-diameter portion 193b substantially corresponds to the central axis of the larger-diameter portion 193a. The smaller-diameter portion 193b is continuous with the larger-diameter portion 193a at a side opposite to the body portion 191. The position regulating portion 195 is attached to the smaller-diameter portion 193b. An inner diameter of the position regulating portion 195 is larger than the outer diameter of the smaller-diameter portion 193b, and smaller than the outer diameter of the larger-diameter portion 193a. In the smaller-diameter portion 193b, a surface facing the inner surface of the position regulating portion 195 is flush with a surface not facing the inner surface of the position regulating portion 195.

The stepped surface 193c has a substantially annular shape. The stepped surface 193c is formed between the larger-diameter portion 193a and the smaller-diameter portion 193b. The stepped surface 193c is continuous with the larger-diameter portion 193a and the smaller-diameter portion 193b. The stepped surface 193c is substantially orthogonal to the central axis of the larger-diameter portion 193a and the smaller-diameter portion 193b.

In the present embodiment, the stepped surface 193c is located within the insertion hole 181. Specifically, in the mounting plate 180, the stepped surface 193c is positioned spaced apart from the position regulating portion 195 with respect to an opposing surface 183 facing the position regulating portion 195 in the central axis direction of the shaft portion 193 (hereinafter simply referred to as the central axis direction).

Expensive materials such as inconel are used for the valve 190. Accordingly, if all of the shaft portion 193 of the valve 190 is formed with a larger-diameter portion 193a, the cost increases. Therefore, in this embodiment, in order to reduce the material of the valve 190, the shaft portion 193 includes the smaller-diameter portion 193b of which diameter is smaller than that of the larger-diameter portion 193a. The smaller-diameter portion 193b reduces the cost of the valve 190 compared to the case where all of the shaft portion 193 is formed by the larger-diameter portion 193a.

In this embodiment, the stepped surface 193c is located in the insertion hole 181. In other words, the larger-diameter portion 193a does not project from the mounting plate 180 to a side closer to the position regulating portion 195. Accordingly, the volume of the larger-diameter portion 193a can be reduced, compared to the case where the larger-diameter portion 193a projects closer to the position regulating portion 195 with respect to the mounting plate 180. As a result, the cost of the valve 190 can be reduced.

The larger-diameter portion 193a needs to be in contact with the inner surface of the insertion hole 181 of the mounting plate 180, when the mounting plate 180 including the rotary shaft 160 rotates (see FIG. 5). In other words, when the mounting plate 180 is inclined with respect to the larger-diameter portion 193a, the larger-diameter portion 193a needs to be in contact with the inner surface of the insertion hole 181 in the inclined direction (movement direction) of the mounting plate 180. If the inner surface of the insertion hole 181 does not contact the larger-diameter portion 193a, the movement of the mounting plate 180 in the inclined direction is not restricted, and an inclination angle of the mounting plate 180 with respect to the larger-diameter portion 193a increases. If the inclination angle of the mounting plate 180 with respect to the larger-diameter portion 193a increases, the mounting plate 180 may contact the position regulating portion 195. If the mounting plate 180 contacts the position regulating portion 195, the position regulating portion 195 may fall off from the shaft portion 193 of the valve 190.

Accordingly, the stepped surface 193c is set at a position where the inner surface of the insertion hole 181 can contact the larger-diameter portion 193a in the inclined direction of the mounting plate 180 when the mounting plate 180 is inclined with respect to the larger-diameter portion 193a. For example, the stepped surface 193c is set at a position such that a height of the larger-diameter portion 193a in the central axis direction is at least half of a thickness of the mounting plate 180. As a result, when the mounting plate 180 is inclined with respect to the larger-diameter portion 193a, the inner surface of the insertion hole 181 can contact the larger-diameter portion 193a. Accordingly, the position regulating portion 195 can avoid falling off from the shaft portion 193 of the valve 190.

The valve 190 and the mounting plate 180 in the present embodiment have no surface finish. In other words, the valve 190 and the mounting plate 180 are formed such that surfaces of workpieces remain unmachined after manufacturing. Accordingly, the valve 190 and the mounting plate 180 of the present embodiment can reduce costs, compared to those with high-precision surface finish.

However, as the valve 190 and the mounting plate 180 have no high-precision surface finish, it is difficult to correctly control the gap between the mounting plate 180 and the position regulating portion 195 due to variation and accumulation in dimensional tolerances (cumulative tolerances) of the valve 190 and the mounting plate 180.

Accordingly, in the present embodiment, the position of the position regulating portion 195 on the smaller-diameter portion 193b is adjusted according to the gap between the position regulating portion 195 and the mounting plate 180, and the position regulating portion 195 is fixed at any position on the smaller-diameter portion 193b. By adjusting and fixing the position of the position regulating portion 195 on the smaller-diameter portion 193b, the gap between the mounting plate 180 and the position regulating portion 195 can be correctly controlled, even if there is variation or accumulation in dimensional tolerances of the valve 190 and the mounting plate 180.

In order to allow adjustment (control) of the gap between the position regulating portion 195 and the mounting plate 180, the stepped surface 193c is formed at a position that cannot contact the position regulating portion 195. In the present embodiment, the stepped surface 193c is located within the insertion hole 181. As a result, the position regulating portion 195 cannot contact the stepped surface 193c, even when the position regulating portion 195 and the mounting plate 180 are in contact with each other. As such, the position regulating portion 195 is attached to the smaller-diameter portion 193b at a position spaced apart from the stepped surface 193c in the central axis direction.

Figure 7:
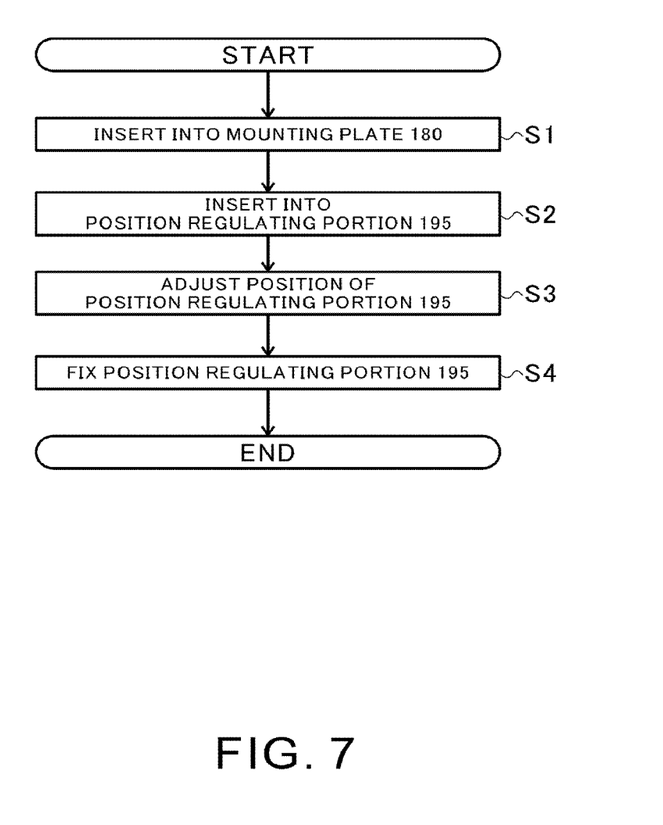
FIG. 7 is a flowchart illustrating an assembly method (manufacturing method) of the valve, the mounting plate, and the position regulating portion.

FIG. 7 is a flowchart illustrating an assembly method (manufacturing method) of the valve 190, the mounting plate 180 and the position regulating portion 195. The flowchart shown in FIG. 7 is performed, for example, by an assembling device (not shown). As shown in FIG. 7, the assembling device inserts the larger-diameter portion 193a of the valve 190 into the insertion hole 181 of the mounting plate 180 (Step S1). The assembling device inserts the smaller-diameter portion 193b of the valve 190 into the hole 195a of the position regulating portion 195 (Step S2). The assembling device adjusts the position regulating portion 195 to a separation position that is spaced apart from the stepped surface 193c in the central axis direction (Step S3).

For example, the assembling device determines the separation position based on a predetermined separation distance that is preset with respect to the opposing surface 183 of the mounting plate 180 (or the stepped surface 193c). The assembling device uses a distance sensor that measures a distance between the opposing surface 183 and the position regulating portion 195 to adjust the position of the position regulating portion 195. This makes it possible to easily and correctly set a load applied between the valve 190 and the seat surface 39 when closing the wastegate port 37.

The assembling device fixes the position regulating portion 195 adjusted to the separation position on the smaller-diameter portion 193b (Step S4). For example, the assembling device fixes the position regulating portion 195 on the smaller-diameter portion 193b by welding or adhesive. As such, assembling process of the valve 190, the mounting plate 180 and the position regulating portion 195 is completed.

As described above, the valve 190 and the mounting plate 180 are formed without machining. The position regulating portion 195 is adjusted in the separation distance from the mounting plate 180, and is fixed in the position spaced apart from the stepped surface 193c in the central axis direction. This allows the gap between the mounting plate 180 and the position regulating portion 195 to be correctly controlled, while reducing the cost of the valve device 100.

(First Variant)

Figure 8:
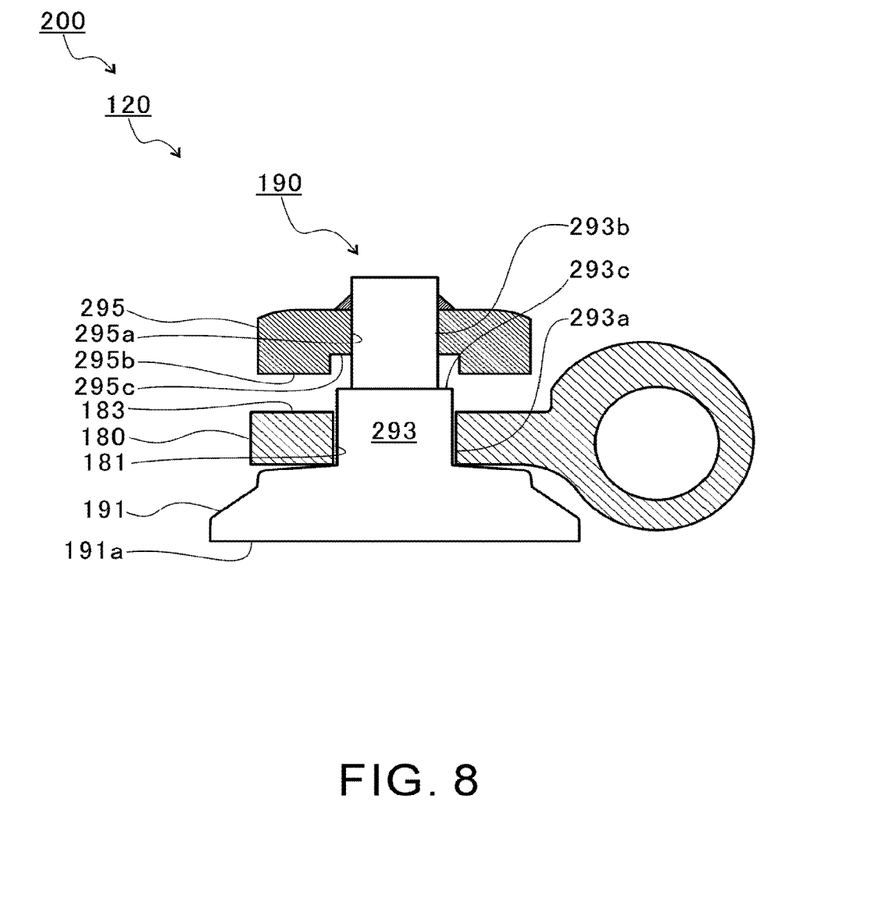
FIG. 8 is an illustration of a configuration of a valve device according to a first variant.

FIG. 8 is an illustration of a configuration of a valve system 200 of a first variant. Components that are substantially equivalent to those of the turbocharger TC of the above embodiment will be marked with the same reference signs, and omitted from the descriptions. The valve device 200 of the first variant includes a shaft portion 293 instead of the shaft portion 193 of the above embodiment, and includes a position regulating portion 295 instead of the position regulating portion 195 of the above embodiment. As shown in FIG. 8, the shaft portion 293 includes a larger-diameter portion 293a, a smaller-diameter portion 293b, and a stepped surface 293c.

The larger-diameter portion 293a has a substantially cylindrical shape. The larger-diameter portion 293a has a substantially constant outer diameter. The larger-diameter portion 293a is continuous with the body portion 191. The larger-diameter portion 293a is at least partially located within the insertion hole 181.

The smaller-diameter portion 293b has a substantially cylindrical shape. The smaller-diameter portion 293b has a substantially constant outer diameter. The outer diameter of the smaller-diameter portion 293b is smaller than that of the larger-diameter portion 293a. A central axis of the smaller-diameter portion 293b substantially corresponds to a central axis of the larger-diameter portion 293a. The smaller-diameter portion 293b is continuous with the larger-diameter portion 293a at a side opposite to the body portion 191. The position regulating portion 295 is attached to the smaller-diameter portion 293b. An inner diameter of the position regulating portion 295 is larger than the outer diameter of the smaller-diameter portion 293b, and smaller than the outer diameter of the larger-diameter portion 293a.

The stepped surface 293c has a substantially annular shape. The stepped surface 293c is formed between the larger-diameter portion 293a and the smaller-diameter portion 293b. The stepped surface 293c is continuous with the larger-diameter portion 293a and the smaller-diameter portion 293b. The stepped surface 293c is substantially orthogonal to the central axis of the larger-diameter portion 293a and the smaller-diameter portion 293b.

The position regulating portion 295 includes a proximate surface 295b that is closest to the mounting plate 180. The position regulating portion 295 includes an opposing portion 295c positioned spaced apart from the mounting plate 180 with respect to the proximate surface 295b and facing the stepped surface 293c in the central axis direction. The opposing portion 295c has a substantially annular shape. An outer diameter of the facing portion 295c is slightly larger than an outer diameter of the stepped surface 293c (larger-diameter portion 293a). A separation distance in the central axis direction between the proximate surface 295b and the opposing portion 295c is greater than a separation distance between the opposing surface 183 of the mounting plate 180 and the stepped surface 293c. However, the separation distance in the central axis direction between the proximate surface 295b and the opposing portion 295c may be equal to or smaller than the separation distance in the central axis direction between the opposing surface 183 of the mounting plate 180 and the stepped surface 293c.

In the first variant, the stepped surface 293c is positioned closer to the position regulating portion 195 with respect to the mounting plate 180. Specifically, the stepped surface 293c is positioned closer to the position regulating portion 195 with respect to the opposing surface 183 facing the position regulating portion 295 in the central axis direction in the mounting plate 180. As such, the strength and wear resistance of the shaft portion 293 can be improved, compared to the case where the stepped surface 193c is located in the insertion hole 181 as in the above embodiment.

In the first variant, the distance between the proximate surface 295b and the opposing portion 295c in the central axis direction is larger than the separation distance between the opposing surface 183 of the mounting plate 180 and the stepped surface 293c. As such, the opposing portion 295c and the stepped surface 193c cannot contact each other, even when the proximate surface 295b and the opposing surface 183 are in contact with each other. Accordingly, an amount of adjustment of the gap between the position regulating portion 295 and the mounting plate 180 can be increased, compared to the case where the opposing portion 295c is not formed in the position regulating portion 295. In the first variant, the valve 190 and the mounting plate 180 are formed without machining as in the above embodiment. The position regulating portion 295 is adjusted in the separation distance from the mounting plate 180, and the opposing portion 295c is fixed in a position spaced apart from the stepped surface 293c in the central axis direction. As such, the same functions and effects as in the above embodiment can be obtained.

(Second Variant)

Figure 9:
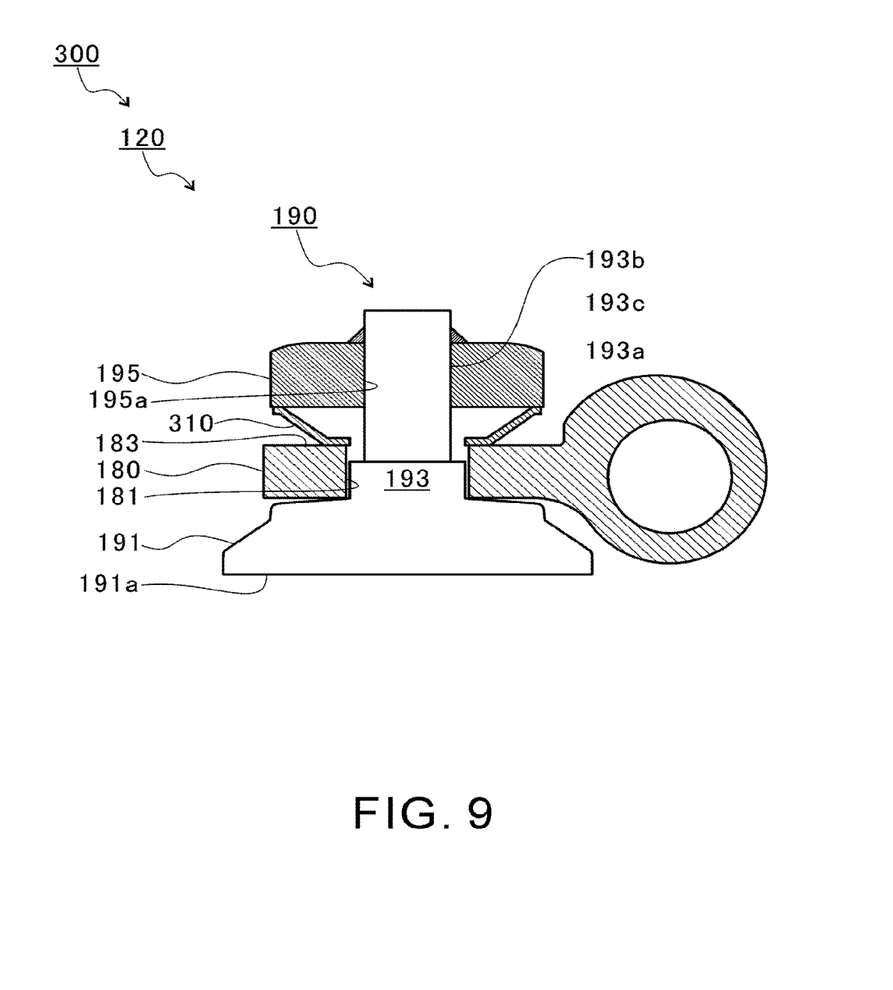
FIG. 9 is an illustration of a configuration of a valve device according to a second variant.

FIG. 9 is an illustration of a configuration of a valve system 300 of a second variant. Components that are substantially equivalent to those of the turbocharger TC of the above embodiment will be marked with the same reference signs, and omitted from the explanations. The valve device 300 of the second variant includes a spring 310 between the mounting plate 180 and the position regulating portion 195, in addition to the valve device 100 of the above embodiment. The other configurations are the same as those in the valve device 100 of the above embodiment.

The spring 310 has a disk shape. In the second variant, the spring 310 is a disk spring. The spring 310 contacts the mounting plate 180 at one end, and the other end contacts the position regulating portion 195. The spring 310 biases the mounting plate 180 and the position regulating portion 195 in directions spaced apart from each other. This prevents a movement of the valve 190 with respect to the mounting plate 180. When closing the wastegate port 37, the spring 310 presses the contact surface 191a of the valve 190 against the seat surface 39, thereby preventing vibration of the valve 190 due to exhaust pulsation.

Figure 10:
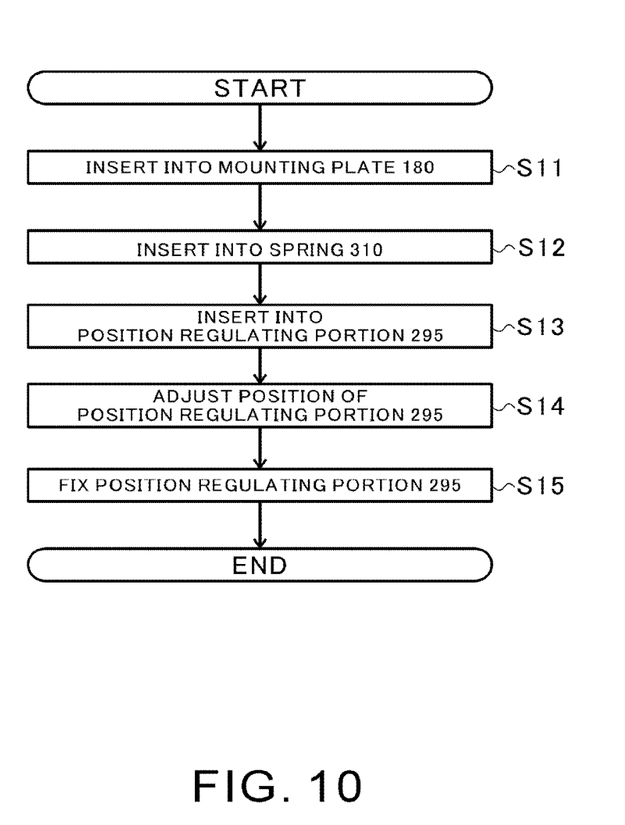
FIG. 10 is a flowchart illustrating an assembly method (manufacturing method) of a valve, a mounting plate, a spring, and a position regulating portion.

FIG. 10 is a flowchart illustrating an assembly method (manufacturing method) of the valve 190, the mounting plate 180, the spring 310 and the position regulating portion 195. The flowchart shown in FIG. 10 is performed, for example, by an assembling device (not shown). As shown in FIG. 10, the assembling device inserts the larger-diameter portion 193a of the valve 190 into the insertion hole 181 of the mounting plate 180 (step S11). The assembling device inserts the smaller-diameter portion 193b of the valve 190 into the spring 310 (Step S12). 10 into the smaller-diameter portion 193b of the valve 190 (Step S12). The assembling device inserts the smaller-diameter portion 193b of the valve 190 into the hole of the position regulating portion 195 (Step S13). As such, the smaller-diameter portion 193b is inserted into the spring 310, after the larger-diameter portion 193a is inserted into the mounting plate 180 and before the smaller-diameter portion 193b is inserted into the position regulating portion 195. The assembling device adjusts the position of the position regulating portion 195 to the separation position that is spaced apart from the stepped surface 193c in the central axis direction (Step S14).

For example, the assembling device determines the separation position based on the load applied to the spring 310. The assembling device arranges a pressure sensor on the contact surface 191a of the valve 190, and moves the position regulating portion 195 in the central axis direction. As the position regulating portion 195 moves in the central axis direction, an output value of the pressure sensor changes depending on a compressed state of the spring 310. The assembling device adjusts the position of the position regulating portion 195 to where the output value of the pressure sensor corresponds to a predetermined value. As such, the load applied to the valve 190 and the seat surface 39 can (correctly) be set with high precision, when the wastegate port 37 is closed.

The assembling device fixes the position regulating portion 195 adjusted to the separation position to the smaller-diameter portion 193b (Step S15). For example, the assembling device fixes the position regulating portion 195 to the smaller-diameter portion 193b by welding or adhesive. As such, assembling process of the valve 190, the mounting plate 180, the spring 310 and the position regulating portion 195 is completed. In the second variation, the same functions and effects as those in the above embodiment can be obtained.

(Third Variant)

Figure 11:
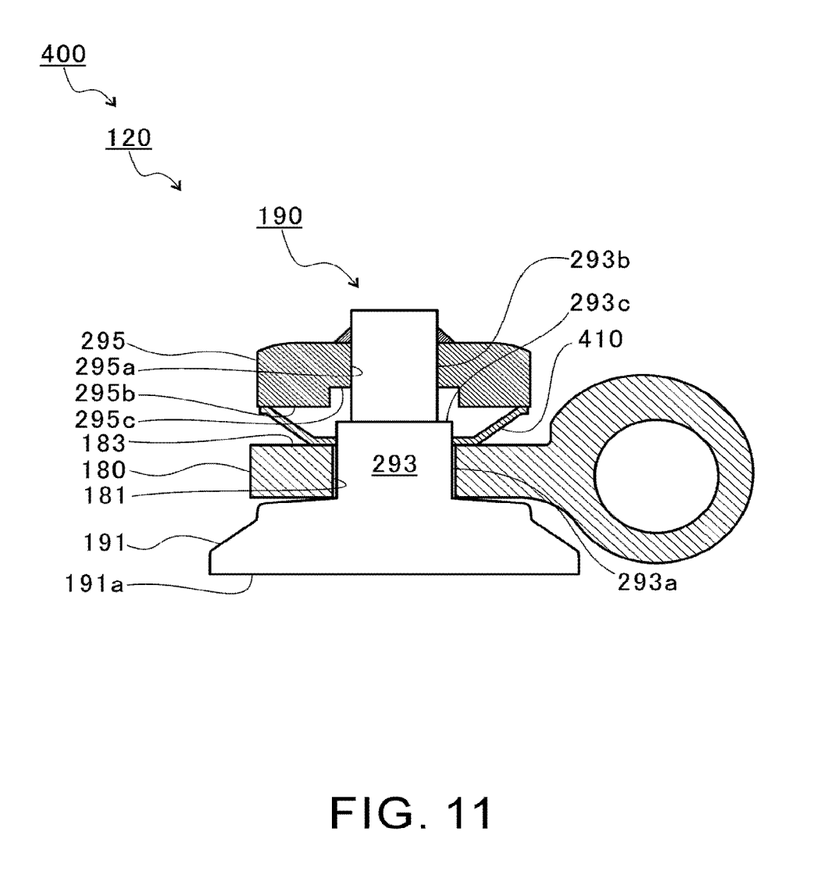
FIG. 11 is an illustration of a configuration of a valve device according to a third variant.

FIG. 11 is an illustration of a configuration of a valve system 400 according to a third variant. Components that are substantially equivalent to those of the turbocharger TC of the above embodiment will be marked with the same reference signs, and omitted from the explanations. The valve device 400 of the third variant includes a spring 410 between the mounting plate 180 and the position regulating portion 295, in addition to the valve device 200 of the above first variant. Other configurations are the same as those in the valve device 200 of the above first variant. In the third variant, the same functions and effects as those in the above embodiment, first variant and second variant can be obtained.

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

In the above embodiment and the first, second and third variants, the examples are described in which the valve 190 is a wastegate valve that opens and closes the wastegate port 37. However, the valve 190 is not limited thereto and can be applied to other valves that open and close openings. For example, the valve 190 may be applied to a valve that opens and closes an opening that connects two turbine scroll flow paths in the turbine housing of a twin scroll turbocharger.

What is claimed is:

1. A valve device comprising:
   a mounting plate including a rotary shaft;
   an insertion hole formed in the mounting plate;
   a valve including a shaft portion inserted into the insertion hole;
   a larger-diameter portion of the shaft portion, at least a part of the larger-diameter portion being located within the insertion hole;
   a smaller-diameter portion of the shaft portion, a diameter of the smaller-diameter portion being smaller than that of the larger-diameter portion;
   a stepped surface formed between the larger-diameter portion and the smaller-diameter portion on the shaft portion; and
   a position regulating portion provided on the smaller-diameter portion, the position regulating portion being attached on the smaller-diameter portion at a position spaced apart from the stepped surface in a central axis direction of the shaft portion, wherein the position regulating portion includes a recess facing the stepped surface in the central axis direction, and wherein the stepped surface is positioned closer to the position regulating portion with respect to an opposing surface of the mounting plate, the opposing surface facing the position regulating portion in the central axis direction.

2. The valve device according to claim 1, comprising a spring arranged between the position regulating portion and the mounting plate.

3. The valve device according to claim 1, wherein an outer diameter of the recess is greater than an outer diameter of the larger-diameter portion.

4. A method for manufacturing a valve device comprising: a mounting plate including a rotary shaft; an insertion hole formed in the mounting plate; a valve including a shaft portion inserted into the insertion hole; a larger-diameter portion of the shaft portion, at least a part of the larger-diameter portion being located within the insertion hole; a smaller-diameter portion of the shaft portion, a diameter of the smaller-diameter portion being smaller than that of the larger-diameter portion; a stepped surface formed between the larger-diameter portion and the smaller-diameter portion on the shaft portion; and a position regulating portion provided on the smaller-diameter portion, the position regulating portion being attached on the smaller-diameter portion at a position spaced apart from the stepped surface in a central axis direction of the shaft portion, the position regulating portion includes a recess facing the stepped surface in the central axis direction, and the stepped surface is positioned closer to the position regulating portion with respect to an opposing surface of the mounting plate, the opposing surface facing the position regulating portion in the central axis direction, the method comprising:

inserting the larger-diameter portion of the valve into the insertion hole of the mounting plate;

inserting the smaller-diameter portion of the valve into a hole of the position regulating portion;

adjusting a position of the position regulating portion to a separation position that is spaced apart from the stepped surface in the central axis direction; and fixing the position regulating portion on the smaller-diameter portion.

5. The method for manufacturing the valve device according to claim 4, wherein the separation position is determined based on a separation distance that is preset with respect to the mounting plate.

6. The method for manufacturing the valve device according to claim 4, further comprising inserting the smaller-diameter portion into a spring before inserting the smaller-diameter portion into the hole, wherein the separation position is determined based on a load applied to the spring.

* * * * *